(12) United States Patent
Chatterjee et al.

(10) Patent No.: US 11,281,169 B2
(45) Date of Patent: Mar. 22, 2022

(54) BUILDING MANAGEMENT SYSTEM WITH POINT VIRTUALIZATION FOR ONLINE METERS

(71) Applicant: Johnson Controls Tyco IP Holdings LLP, Milwaukee, WI (US)

(72) Inventors: Abhigyan Chatterjee, Asansol District-Burdwan (IN); Rajesh C. Nayak, Vidyaratna Nagar Manipal (IN); Barkha Shah, West Mumbai (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 236 days.

(21) Appl. No.: 16/052,083

(22) Filed: Aug. 1, 2018

(65) Prior Publication Data

US 2019/0146430 A1 May 16, 2019

(30) Foreign Application Priority Data

Nov. 15, 2017 (IN) .............................. 201741040781

(51) Int. Cl.
*G05B 15/02* (2006.01)
*F24F 11/52* (2018.01)
(Continued)

(52) U.S. Cl.
CPC .............. *G05B 15/02* (2013.01); *F24F 3/001* (2013.01); *F24F 11/52* (2018.01); *F24F 11/56* (2018.01);
(Continued)

(58) Field of Classification Search
CPC .. F24F 11/52; F24F 11/56; F24F 11/64; F24F 11/65; F24F 3/001; G05B 15/02; G05B 2219/25011
See application file for complete search history.

(56) References Cited

U.S. PATENT DOCUMENTS 6,088,659 A    7/2000  Kelley et al.
6,487,457 B1   11/2002 Hull et al.
(Continued)

FOREIGN PATENT DOCUMENTS

WO    WO-2017/127373    7/2017

OTHER PUBLICATIONS

International Search Report and Written Opinion on PCT/US2018/060704, dated Mar. 4, 2019, 17 pages.
(Continued)

*Primary Examiner* — Kidest Bahta
(74) *Attorney, Agent, or Firm* — Foley & Lardner LLP

(57) ABSTRACT

A building management system includes a meter configured to provide data samples of a real point. The real point corresponds to a first physical parameter measured by the meter. The building management system also includes an analytics circuit configured to store a real point object representing the real point and store a meter object representing the meter. The meter object includes a points attribute that lists one or more point objects associated with the meter object including at least the real point object. The analytics circuit is also configured to store a virtual point object representing a virtual point. The virtual point corresponds to a second physical parameter not measured by the meter. The analytics circuit is also configured to update the points attribute in the meter object to list the virtual point object as one of the point objects associated with the meter object.

20 Claims, 11 Drawing Sheets

(51) Int. Cl.
*F24F 11/65* (2018.01)
*F24F 11/64* (2018.01)
*F24F 11/56* (2018.01)
*F24F 3/00* (2006.01)

(52) U.S. Cl.
CPC .............. *F24F 11/64* (2018.01); *F24F 11/65* (2018.01); *G05B 2219/25011* (2013.01)

(56) References Cited

U.S. PATENT DOCUMENTS

| | | | |
|---|---|---|---|
| 9,217,994 B2 | 12/2015 | Ainsley et al. | |
| 9,413,852 B2 | 8/2016 | Lawson et al. | |
| 9,471,946 B1 | 10/2016 | Keil et al. | |
| 2006/0071812 A1* | 4/2006 | Mason, Jr. | G01D 4/004 340/870.02 |
| 2006/0265489 A1 | 11/2006 | Moore | |
| 2009/0052677 A1* | 2/2009 | Smith | H04R 29/008 381/56 |
| 2010/0028693 A1* | 2/2010 | Okafuji | H01B 1/127 428/423.7 |
| 2010/0042372 A1* | 2/2010 | Carter | G01D 4/004 702/189 |
| 2010/0286937 A1* | 11/2010 | Hedley | G06Q 30/02 702/60 |
| 2011/0245986 A1* | 10/2011 | Campanile | F01K 13/02 700/288 |
| 2011/0264418 A1* | 10/2011 | Szewczyk | H02J 13/0006 703/2 |
| 2012/0022700 A1* | 1/2012 | Drees | G05B 15/02 700/276 |
| 2012/0053739 A1* | 3/2012 | Brian | G06F 1/3203 700/287 |
| 2012/0083930 A1 | 4/2012 | Ilic et al. | |
| 2013/0184887 A1 | 7/2013 | Ainsley et al. | |
| 2014/0196131 A1* | 7/2014 | Lee | G06F 21/35 726/7 |
| 2016/0210569 A1* | 7/2016 | Enck | G06Q 10/0637 |
| 2017/0070775 A1 | 3/2017 | Taxier et al. | |
| 2017/0122773 A1* | 5/2017 | Ho | G01D 4/002 |
| 2017/0212482 A1 | 7/2017 | Boettcher et al. | |
| 2017/0212668 A1 | 7/2017 | Shah et al. | |
| 2017/0357225 A1 | 12/2017 | Asp et al. | |
| 2017/0357490 A1 | 12/2017 | Park et al. | |
| 2018/0046151 A1 | 2/2018 | Ahmed | |
| 2018/0232422 A1 | 8/2018 | Park et al. | |
| 2018/0232423 A1 | 8/2018 | Park et al. | |
| 2018/0232459 A1 | 8/2018 | Park et al. | |
| 2018/0284736 A1 | 10/2018 | Cella et al. | |
| 2018/0375678 A1 | 12/2018 | Lapsley | |
| 2018/0375679 A1 | 12/2018 | Lapsley | |
| 2019/0032948 A1 | 1/2019 | Nayak et al. | |
| 2019/0033802 A1 | 1/2019 | Chatterjee et al. | |
| 2019/0033803 A1 | 1/2019 | Chatterjee et al. | |
| 2019/0033811 A1 | 1/2019 | Nayak et al. | |
| 2019/0034066 A1 | 1/2019 | Nayak et al. | |
| 2019/0034309 A1 | 1/2019 | Nayak et al. | |
| 2019/0087762 A1 | 3/2019 | Ranjan et al. | |

OTHER PUBLICATIONS

European Office Action on EP Appl. No. 18812011.7 dated Nov. 11, 2021 (12 pages).

* cited by examiner

BUILDING MANAGEMENT SYSTEM WITH POINT VIRTUALIZATION FOR ONLINE METERS

CROSS-REFERENCE TO RELATED PATENT APPLICATION

This application claims the benefit of and priority to Indian Provisional Patent Application No. 201741040781 filed Nov. 15, 2017, incorporated by reference herein in its entirety.

BACKGROUND

The present disclosure relates generally to a building management system (BMS) and more particularly to a BMS with point virtualization for online meters. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS typically monitors multiple facilities and/or buildings within a portfolio using meters that provide live or real-time data samples to the BMS relating to conditions of the building and/or building equipment that serves the building. Each meter may provide one or more points corresponding to physical parameters (e.g., voltage, current, temperature, demand, consumption) to the BMS. The BMS relies on meters to provide data samples of the points, and uses the data to generate metrics, key performance indictors (KPIs), graphical representations of building equipment operation, etc. to deliver to customers. High-end meters may be compatible with BMS networks (e.g., BACnet, Internet Protocol) and may provide multiple points via a single meter, but may be cost prohibitive for many potential BMS customers. Lower-cost or already-installed metering infrastructure generally includes meters which provide only one or two points. The low-cost meters may not provide enough points to make use of many BMS analytics and features. An alternative to adding new, physical meters is simulating virtual points within the BMS.

SUMMARY

One implementation of the present disclosure is a building management system. The building management system includes a meter configured to provide data samples of a real point. The real point corresponds to a first physical parameter measured by the meter. The building management system also includes an analytics circuit configured to store a real point object representing the real point and store a meter object representing the meter. The meter object includes a points attribute that lists one or more point objects associated with the meter object including at least the real point object. The analytics circuit is also configured to store a virtual point object representing a virtual point. The virtual point corresponds to a second physical parameter not measured by the meter. The analytics circuit is also configured to update the points attribute in the meter object to list the virtual point object as one of the point objects associated with the meter object, receive a data sample of the real point from the meter, calculate a value of the virtual point, and calculate a metric based on the data sample of the real point and the value of the virtual point. The building management system also includes a system manager configured to control building equipment using the metric to affect the first physical parameter and the second physical parameter.

In some embodiments, the analytics circuit is configured to calculate the value of the virtual point using a formula stored in the virtual point object. In some embodiments, the analytics circuit is configured to calculate the value of the virtual point using a formula stored in the virtual point object. In some embodiments, the formula defines the value of the virtual point as a function of the data sample of the real point. In some embodiments, the first physical parameter and the second physical parameter characterize operation of the building equipment.

In some embodiments, the analytics circuit is further configured to generate a graphical user interface that includes a graphical representation of the operation of the building equipment. The graphical representation is generated based on the data sample of the real point and the value of the virtual point. In some embodiments, the graphical user interface comprises a first indicator identifying the real point as real and a second indicator identifying the virtual point as virtual.

Another implementation of the present disclosure is a method for managing a building. The method includes collecting, by a meter, data samples of a real point. The real point corresponds to a first physical parameter measured by the meter. The method includes storing a real point object representing the real point and storing a meter object representing the meter. The meter object includes a points attribute that lists one or more point objects associated with the meter object including at least the real point object. The method includes storing a virtual point object representing a virtual point. The virtual point corresponds to a second physical parameter not measured by the meter. The method includes updating the points attribute in the meter object to list the virtual point object in as one of the point objects associated with the meter object, receiving a data sample of the real point from the meter, calculating a value of the virtual point, calculating a metric based on the data sample of the real point and the value of the virtual point, and controlling, based on the metric, building equipment to affect the first physical parameter and the second physical parameter.

In some embodiments, calculating the value of the virtual point includes storing a formula in the virtual point object and calculating the value using the formula. In some embodiments, the method includes generating a graphical user interface that allows the user to input the formula. In some embodiments, the formula defines the value of the virtual point as a function of the data sample for the real point. In some embodiments, the first physical parameter and the second physical parameter characterize operation of the building equipment.

In some embodiments, the method includes generating a graphical user interface that includes a graphical representation of the operation of the building equipment based on the data sample of the real point and the value of the virtual point. In some embodiments, the method includes providing, on the graphical user interface, a first indicator identifying the real point as real and a second indicator identifying the virtual point as virtual.

Another implementation of the present disclosure is a building management system. The building management system includes building equipment operable to affect a variable state or condition of a building, a plurality of meters configured to collect data samples of a plurality of real points relating to an operation of the building equipment, and an analytics circuit configured to generate a graphical user interface. The graphical user interface includes a points tree widget comprising a list of the plurality of real points, a meter distribution tree widget comprising a list of the plurality of meters, and a meter details widget configured to allow a user to add a virtual point to the list of real points. The analytics circuit is also configured to receive data samples of the plurality of real points, calculate a value of the virtual point, and calculate a metric based on the data samples of the plurality of real points and the value of the virtual point. The building management system also includes a system manager configured to control the building equipment based on the metric.

In some embodiments, the graphical user interface includes a virtual point definition widget configured to allow a user to input a formula that defines the virtual point. In some embodiments, the analytics circuit is configured to generate the value of the virtual point using the formula and a first data sample of a first real point of the plurality of real points. In some embodiments, the analytics circuit is configured to generate a graphical representation of an operation of the building equipment using the formula and the data samples of the plurality of real points.

In some embodiments, the virtual point definition widget comprises a formula field and a list of the plurality of real points. Each real point on the list of real points is selectable to add the real point to the formula field. The virtual point definition widget also includes a plurality of operator buttons. Each operator button is selectable to add an operator to the formula field. The formula includes one or more real points and one or more operators to define the virtual point as a function of the one or more real points. In some embodiments, the analytics circuit is configured to check the formula input by the user for syntax errors.

DETAILED DESCRIPTION

Building HVAC Systems and Building Management Systems

Figure 1:
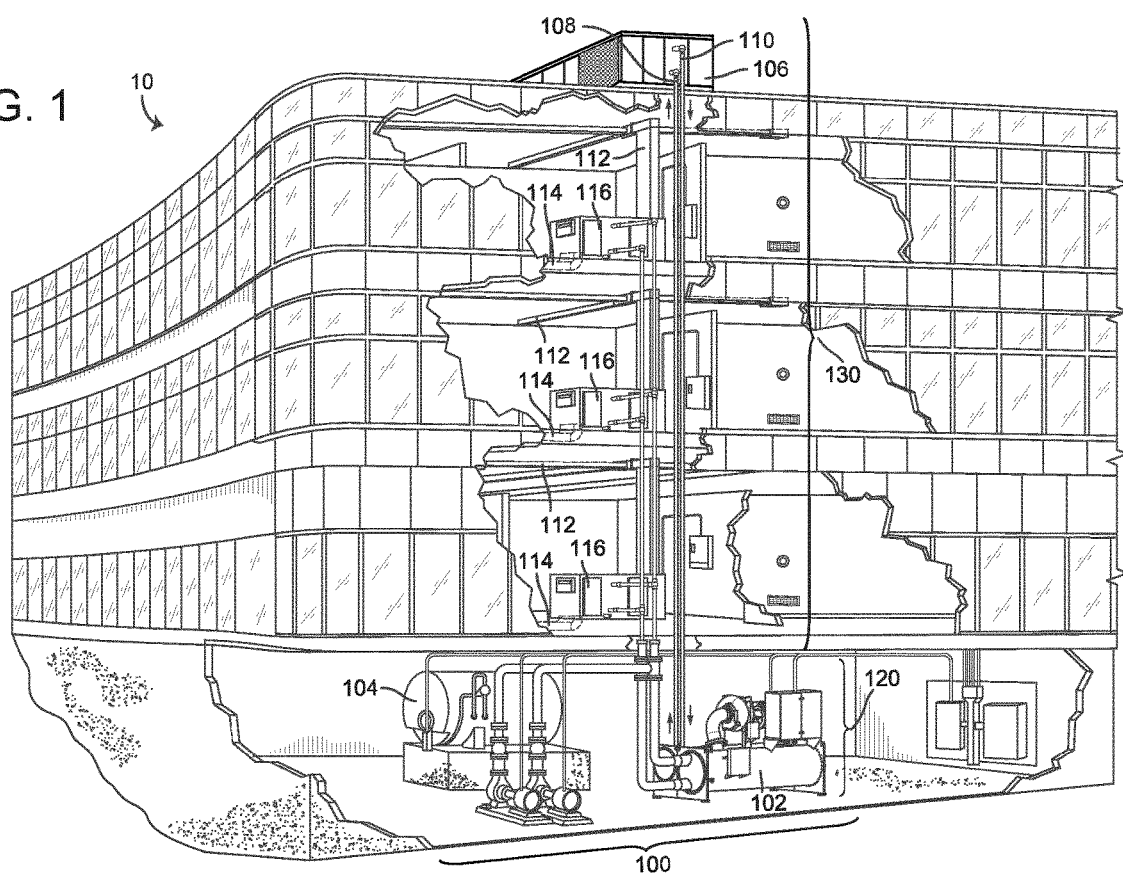
FIG. 1 is a drawing of a building equipped with a HVAC system, according to some embodiments.
Figure 2:
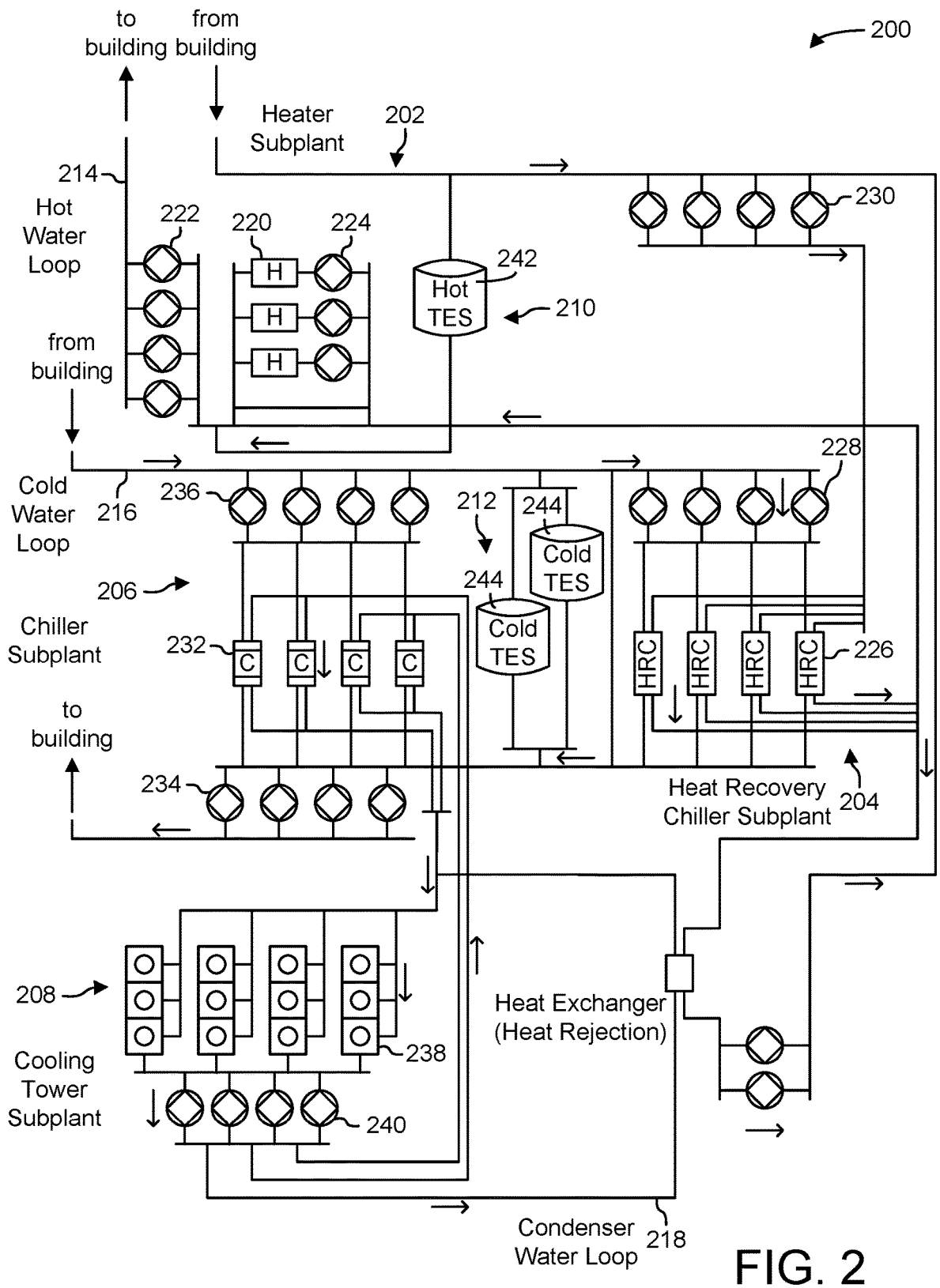
FIG. 2 is a block diagram of a waterside system which can be used to serve the building of FIG. 1, according to some embodiments.
Figure 3:
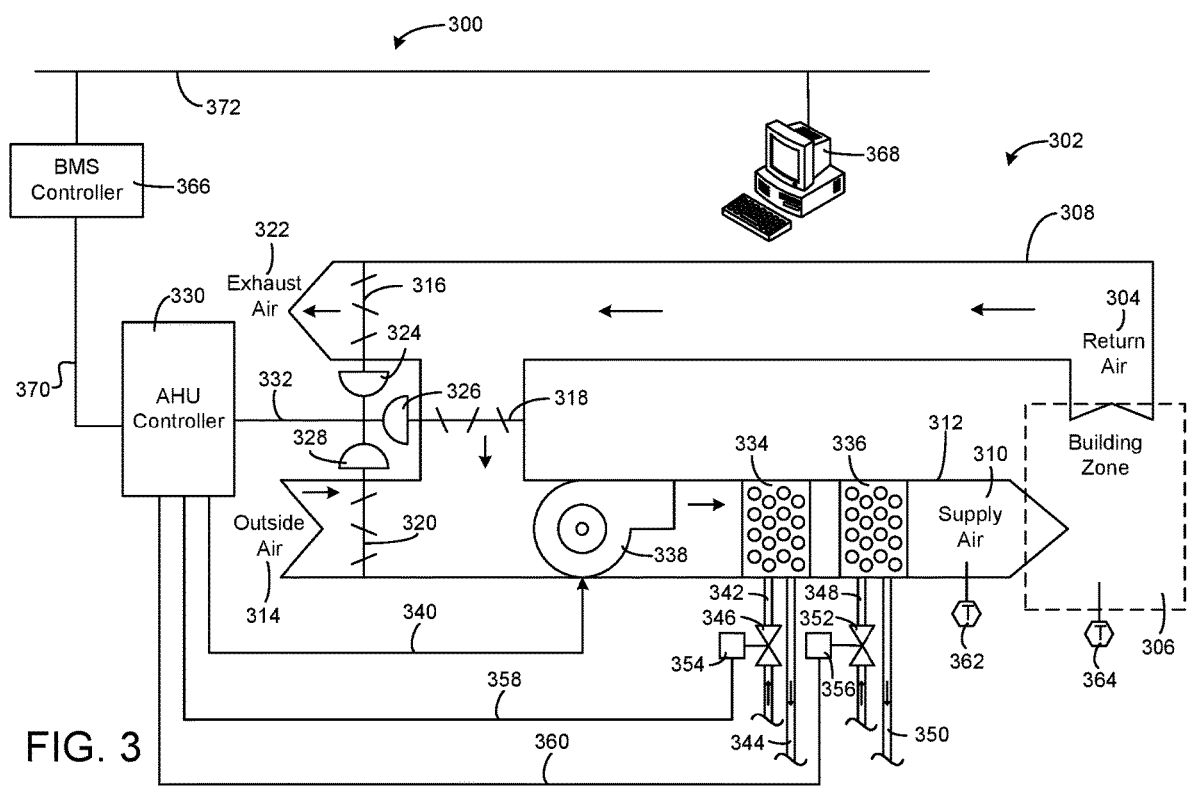
FIG. 3 is a block diagram of an airside system which can be used to serve the building of FIG. 1, according to some embodiments.
Figure 4:
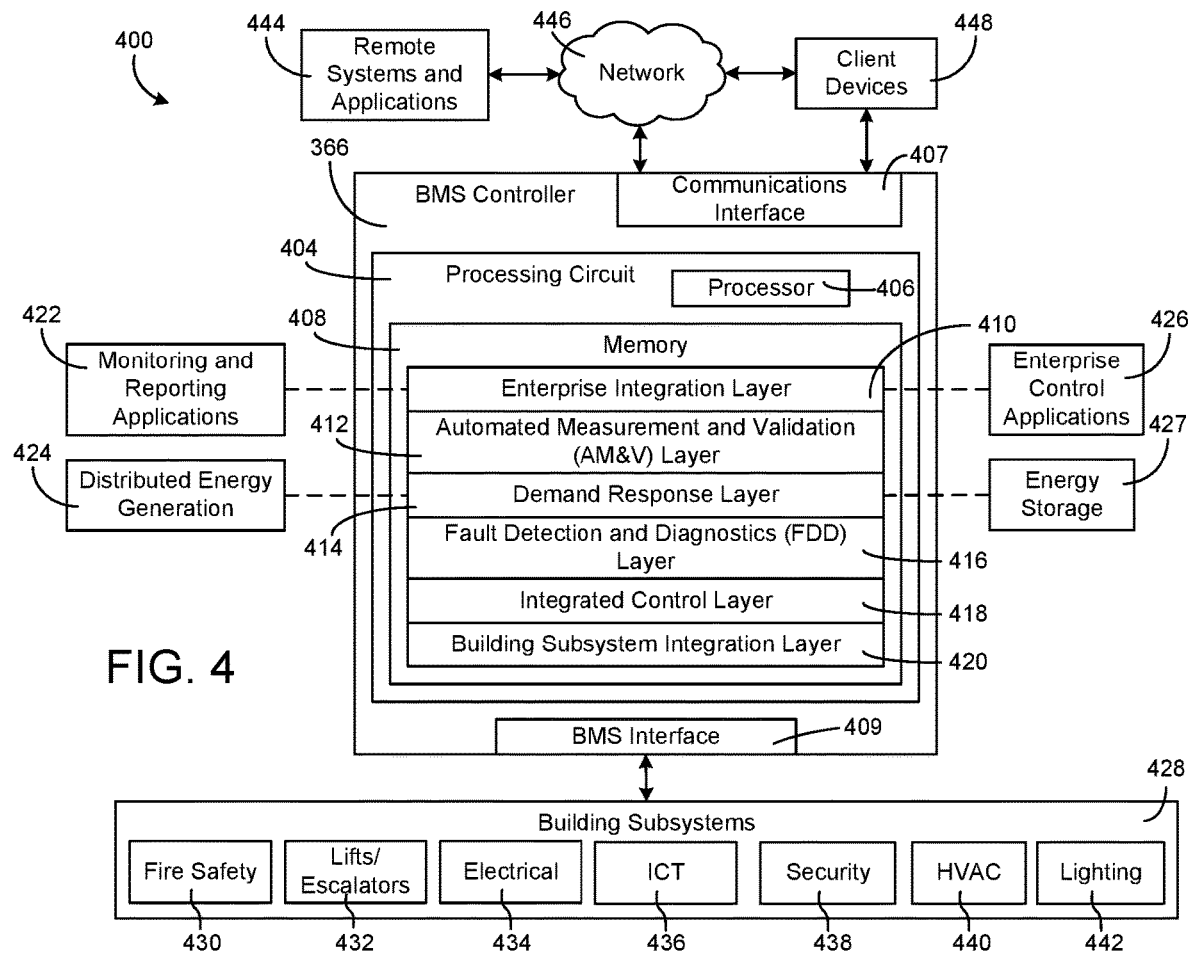
FIG. 4 is a block diagram of a building management system (BMS) which can be used to monitor and control the building of FIG. 1, according to some embodiments.
Figure 5:
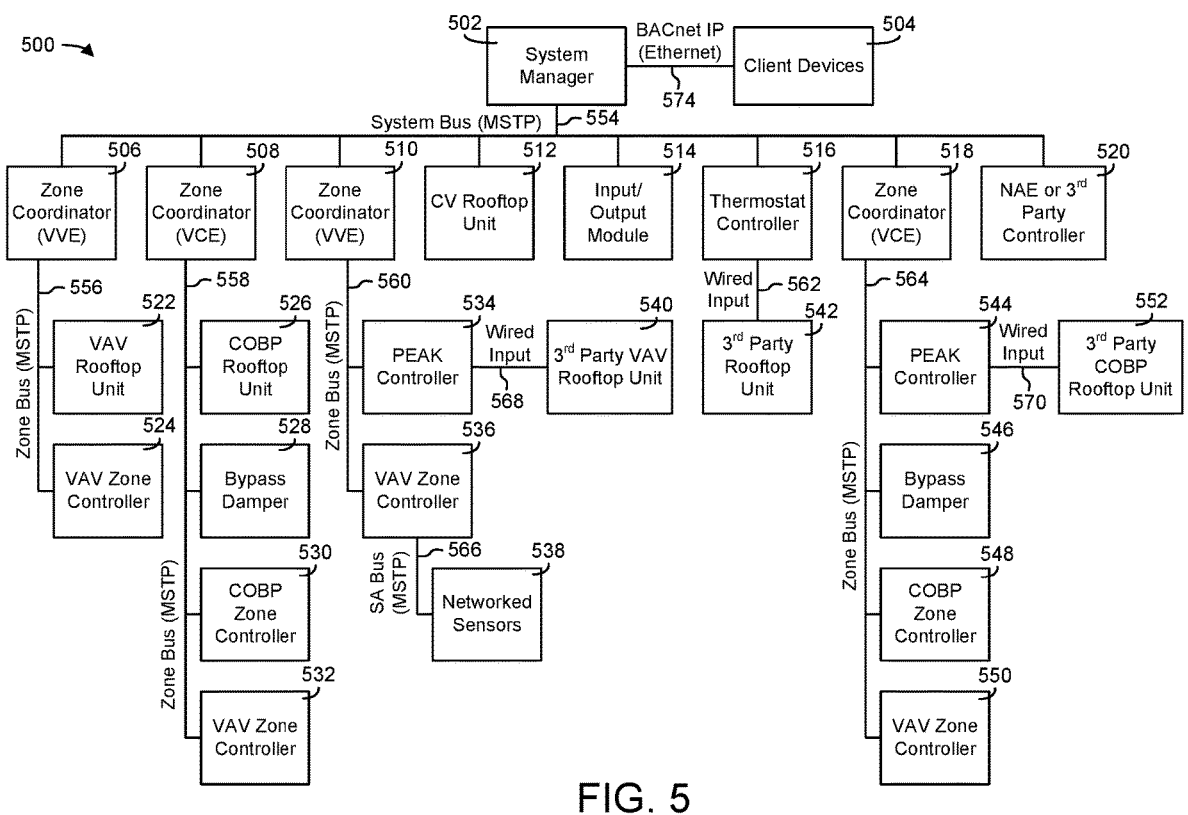
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Point Virtualization Under Online Meters

Referring now to FIG. 6-10, several drawings illustrating systems and methods for point virtualization under online meters in a BMS are shown. In some embodiments, the point virtualization systems and methods described herein are implemented with BMS 400 or BMS 500, as described with reference to FIGS. 4-5.

Figure 6:
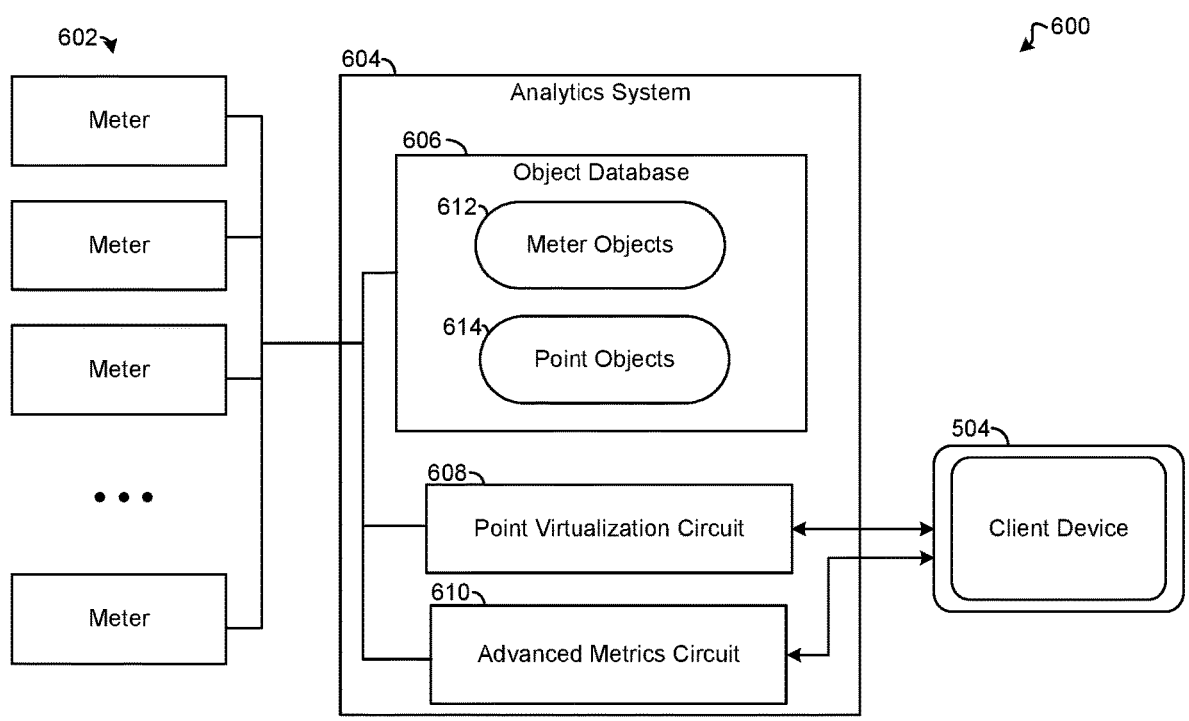
FIG. 6 is a block diagram of a BMS with a point virtualization circuit 608, according to some embodiments.

Referring now to FIG. 6, a block diagram of a BMS 600 with point virtualization is shown. The BMS 600 includes multiple meters 602 that provide data samples for multiple real points measured by the meters 602 (e.g., collected by sensors included with the meters 602). As used herein, the term "real point" refers to a point that is measured or observed by one or more of the meters 602. A real point may represent a physical parameter of the building and/or building equipment served by BMS 600 (e.g., a temperature point measured by a temperature sensor of the meters 602, a power consumption measured by a power meter of the meters 602, a flow rate measured by a flow meter of the meters 602, etc.). Accordingly, the meters 602 provide raw data for real points corresponding to physical parameters of the building and/or building equipment served by the BMS 600. Conversely, the term "virtual point" refers to a point that is not directly measured by the meters 602 but rather is calculated or simulated based on one or more real points, other virtual points, and/or other parameters or values.

In many cases the real points measured by the meters 602 are not sufficient to allow the BMS 600 to calculate all metrics, key performance indicators, etc. desired by users of the BMS 600 or necessary for implementing various features of the BMS 600. Thus, as described in detail below, the BMS 600 provides for point virtualization under online meters 602 to provide an efficient, user-friendly, and cost-effective way to cover for deficiencies in the amount or type of data provided by the meters 602.

As shown in FIG. 6, the BMS 600 includes an analytics system 604 that facilitates point virtualization and provides for the calculation of advanced metrics (e.g., key performance indicators) based on both real points and virtual points. In some embodiments, the analytics system 604 is a component of BMS 400 or BMS 500, for example included with system manager 502. As illustrated in FIG. 6, the analytics system 604 includes an object database 606, a point virtualization circuit 608, and an advanced metrics circuit 610.

Figure 7:
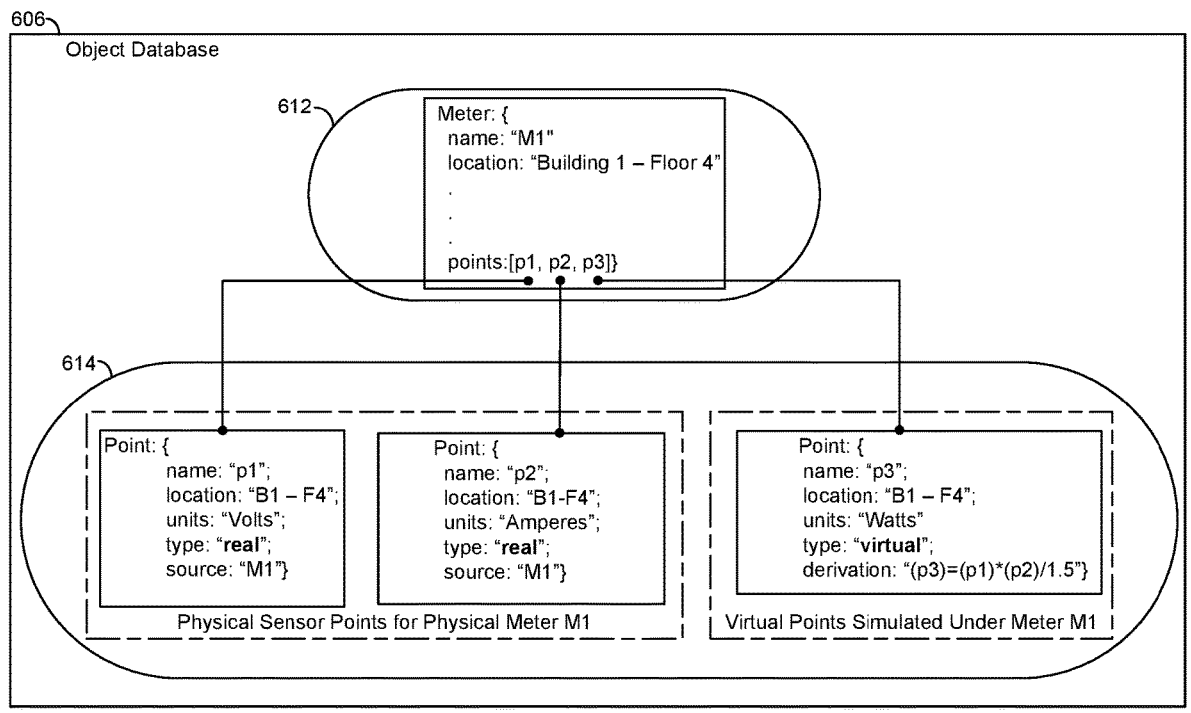
FIG. 7 is a block diagram of an object database 606 which can be used in the BMSs of FIGS. 4-5, according to some embodiments.

The object database 606 is configured to store data objects corresponding to various elements and features of the BMS 600, for example meter objects 612 and point objects 614. Each meter object 612 is an electronic representation of one of the meters 602 in the BMS 600, and each point object 614 is an electronic representation of a real point (i.e., corresponding to a real-world measurement from a meter 602) or virtual point (i.e., corresponding to a simulated value not provided directly by a meter 602). Each point object 614 includes a set of attributes associated with the corresponding point, and each meter object includes a set of attributes associated with the corresponding meter, as illustrated in FIG. 7 and described with reference thereto below. For example, as an attribute of each meter object, the object database 606 may store a list of points associated with that meter.

Figure 9:
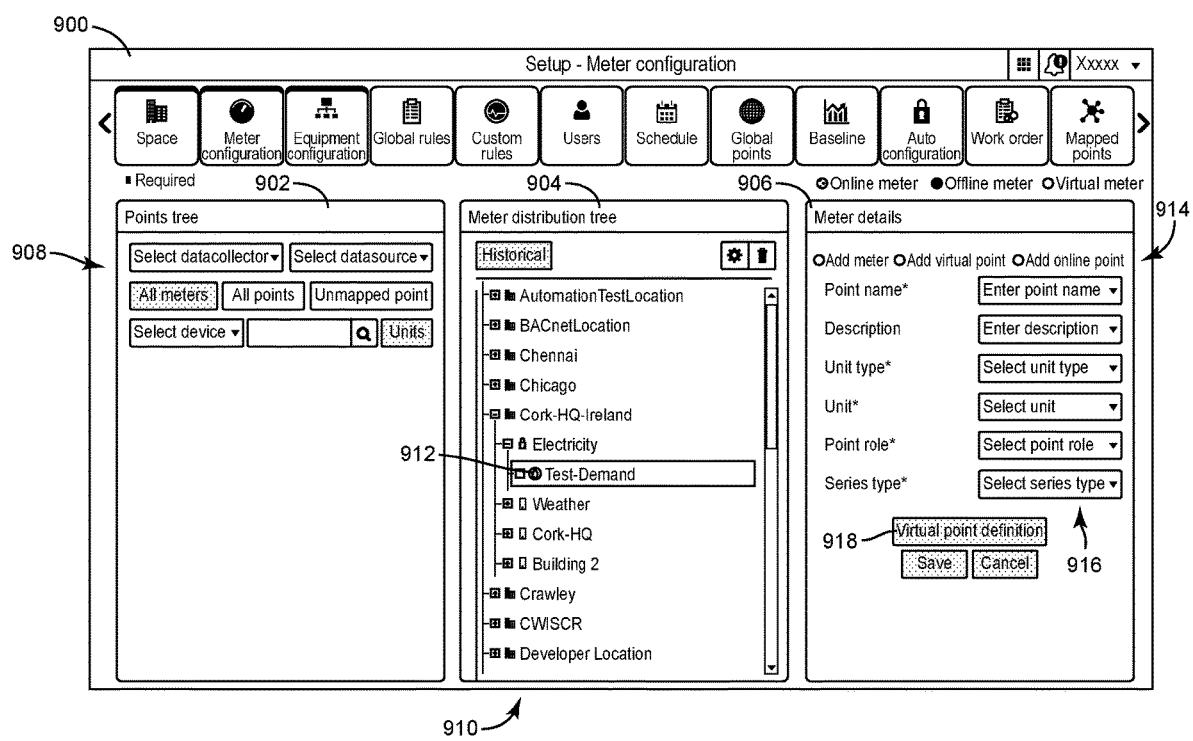
FIG. 9 is a depiction of a meter configuration interface which can be generated by the BMS of FIG. 6, according to some embodiments.
Figure 10:
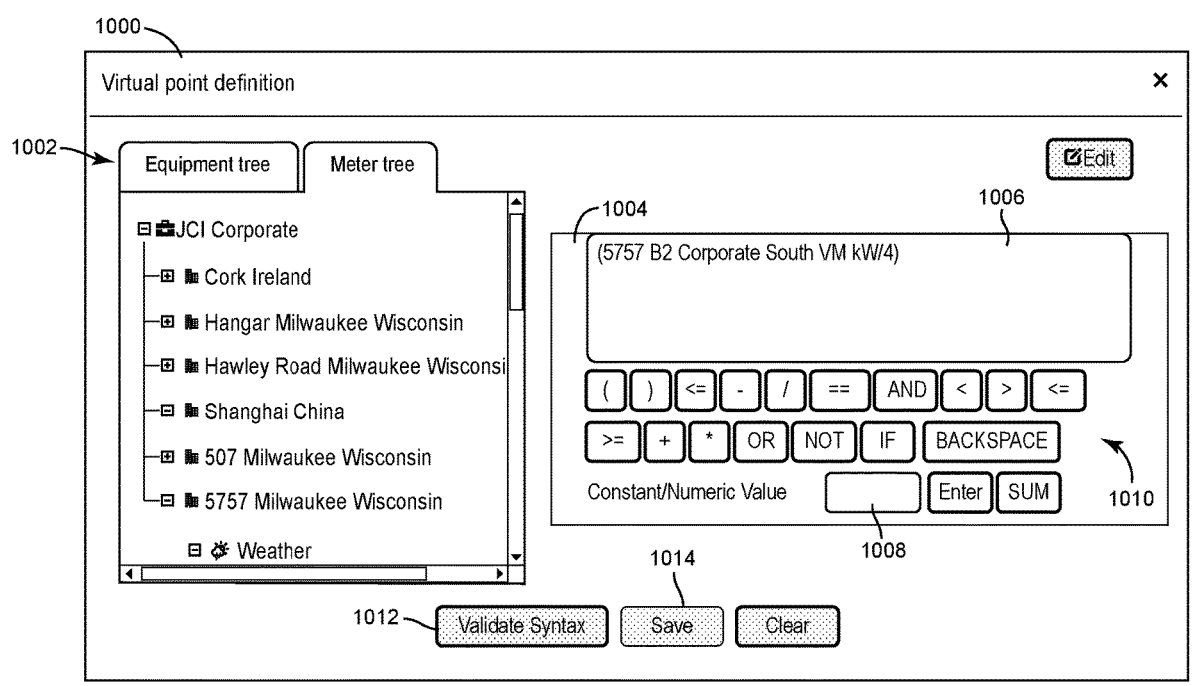
FIG. 10 is a depiction of virtual point definition widget which can be generated by the BMS of FIG. 6, according to some embodiments.
Figure 11:
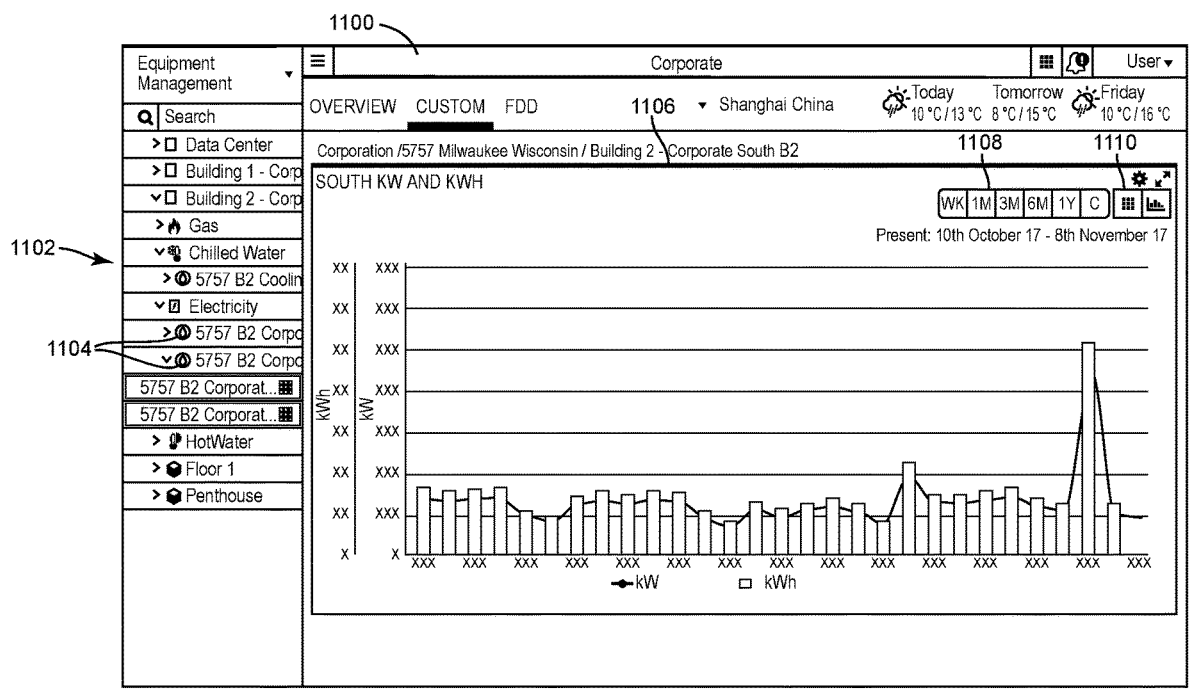
FIG. 11 is a depiction of a building scorecard dashboard which can be generated by the BMS of FIG. 6, according to some embodiments.

The point virtualization circuit 608 is configured to create virtual point objects, store virtual point objects in the object database 606 as point objects 614, and alter the attributes of the meter objects 612 to list virtual point objects 614 as associated with meter objects 612, for example as described with reference to FIG. 8 below. The point virtualization circuit 608 thereby facilitates the creation of virtual points under online meters, i.e., such that a meter 602 may be associated with both real points and virtual points. The point virtualization circuit 608 may also communicate with a user device (shown as client device 504). The point virtualization circuit 608 may generate a user interface for presentation on the user device (e.g., tablet, laptop, desktop computer, smartphone) that allows the user to request the creation of new virtual points, map virtual points to meters 602, and define derivation formulas for virtual point objects. Examples of such graphical user interfaces are shown in FIGS. 9-11 and described in detail with reference thereto.

The advanced metrics circuit 610 is configured to calculate metrics (e.g., key performance indicators, roll-ups, space aggregations, fault detection and diagnostics) relating to the building and/or building equipment served by the BMS 600. The advanced metrics circuit 610 may receive data from the meters 602 and determine a value for each point associated with each meter, including both virtual points and real points. The advanced metrics circuit 610 may then treat virtual points and real points identically to calculate metrics based on the values of the points. This may allow the advanced metrics circuit 610 to calculate all desired metrics even where the real points do not directly correspond to the inputs necessary to calculate that metric and without regard to whether the metric is calculated from real points, virtual points, or some combination thereof. In some embodiments, the advanced metrics circuit 610 may receive a request to calculate a metric from a client device 504, calculate the metric in response, and provide the metric to the client device 504 for presentation in a graphical user interface.

As one illustrative example, a building may include a first space served by a first meter and a second space served by a second meter. The first meter may collect a first real point for the first space corresponding to a physical parameter (e.g., power consumption), but the second meter may not be configured to collect data for that physical parameter. In such a situation, a second virtual point corresponding to the physical parameter in the second space may be created under the second meter by creating a virtual point object associated with a meter object for the second meter. Then, the advanced metrics circuit 610 may calculate an aggregate metric for the building (i.e., for the first space and the second space) using data for the first real point and data for the second virtual point. For example, the advanced metrics circuit 610 may add a value of the first real point to a value of second virtual point to determine a total value for the building.

Referring now to FIG. 7, a block diagram of the object database 606 of the BMS 600 is shown, according to an exemplary embodiment. In some embodiments, the object database 606 is a component of BMS 400 or BMS 500. The object database 606 can store meter objects 612 corresponding to each physical meter deployed in the buildings or facilities managed by the BMS 600, illustrated by an example meter object 616 in FIG. 7. The meter object 616 may include meter attributes including, for example, the meter name (e.g., "M1"), meter location (e.g., "Building 1-Floor 4"), and/or the points provided by that meter (e.g., "p1," "p2," and "p3"). The points listed in the meter object 616 may include both real points (i.e., points directly collected by the physical meter 602) and virtual points (i.e., simulated points calculated indirectly from data collected by one or more meters 602).

The object database 606 can also store a point object for each of one or more points, including real points provided by a meter 602 and virtual points associated with a meter 602 in the object database 606. FIG. 6 illustrates an example in which three point objects 618, 620, and 622 (representing points "p1," "p2," and "p3" respectively) are associated with a meter object 616 (representing meter "M1"). Each point object 618-622 includes attributes for the corresponding point, for example the point name, the point location, the point's units, and point type. The point type may indicate whether the point corresponds to a physical measurement or the point is a virtual point simulated within the BMS 600. For a real point (i.e., a point corresponding to a physical measurement), the point object 618-620 may include the point source, indicating the meter associated with the point. For a virtual point, the point object 622 may include a derivation formula which defines how a data series associated with the virtual point is derived from data associated with other points, from a model or simulation, or from based on some other dataset.

FIG. 7 illustrates that the points attribute of the meter object 616 may list both real points and virtual points. In the example shown, points "p1" and "p2" are real points whereas point "p3" is a virtual point. As shown, by listing real points and virtual points together in the points attribute, the meter object 616 treats real and virtual point objects identically and makes no differentiation between real and virtual points. Virtual point objects such as point object 622 need not be organized or stored under separate virtual meter objects or otherwise differentiated at the level of the meter objects 612. Instead, a virtual point object 622 is included under the meter object 616 to associate the virtual point p3 with a physical meter M1, which is referred to herein as point virtualization under online meters. The BMS 600 (e.g., the advanced metrics circuit 610) may then use a virtual point like any other point in calculating meter roll-ups and key performance indicators and generating displays of meter information for users. Point virtualization under online meters thereby facilitates calculation of metrics that require points not provided by real meters, improves efficiency and reduces complexity relative to other potential ways to simulate points (e.g., by creating virtual meters), and provides an intuitive framework that facilitates a user in understanding and configuring virtual points.

Figure 8:
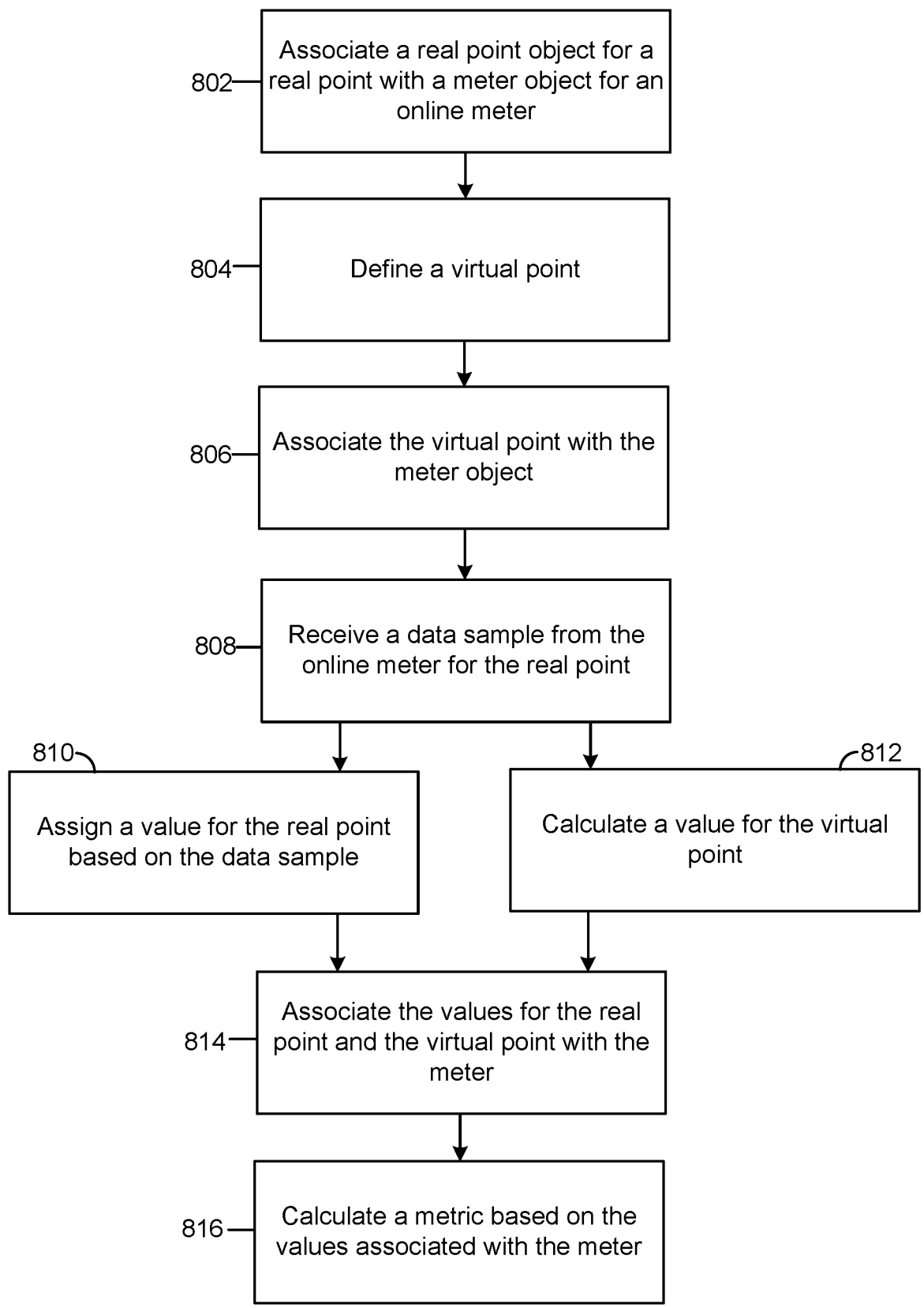
FIG. 8 is a flowchart of a process for point virtualization under online meters, according to some embodiments.

Referring now to FIG. 8, a flowchart of a process 800 for point virtualization under online meters is shown, according to an exemplary embodiment. At step 802, the analytics system 604 associates a real point object for a real point with a meter object for an online meter 602. The analytics system 604 stores the real point object and the meter object in an object database 606. In some embodiments, the analytics system 604 associates the real point object with the meter object by listing the real point object or a designation thereof (e.g., point name) in a points attribute of the meter object. In some embodiments, the analytics system 604 associates the real point object with the meter object by listing the meter object or a designation thereof (e.g., meter name) in a meter attribute of the point objects.

At step 804, a virtual point is defined in the analytics system 604, for example by a formula or other algorithm for calculating a value of the virtual point. For example, the virtual point may be defined as a function of real points, such that a value of the virtual point at a given time step may be calculated based on the values of real points for that time step (i.e., based on data collected by meters 602). The virtual point may also, or alternatively, be defined to have a value generated by some other simulation, model, dataset, etc. In some embodiments, the analytics system 604 receives user input defining the virtual point from a client device 504, for example as described with reference to FIGS. 9-11 below.

At step 806, the analytics system 604 associates the virtual point with the meter object. The analytics system 604 may associate the virtual point with the meter object by listing the virtual point in an attribute of the meter object (e.g., a points attribute that lists the points associated with the meter, including both virtual points and real points). The meter object may thereby treat virtual points and real points identically. Higher-level calculations, roll-ups, etc. may then simply deal with all points in a similar or identical way, avoiding any computational complexity and expense that may be created by other approaches to point virtualization.

At step 808, the analytics system 604 receives a data sample from an online meter 602 for the real point. For example, the analytics system 604 receives an analog or digital signal, measurement, data value, sample, or other value of the real point from the online meter 602 associated with the real point. At step 810, the analytics system 604 assigns a value for the real point based on the data sample. For example, in an embodiment where the data sample is an analog signal, the analytics system 604 may determine a digital representation of a numerical value of the real point based on the data sample and store that representation as the value of the real point.

At step 812, a value for the virtual point is calculated based on the definition of the virtual point created at step 804. For example, the virtual point may be calculated based on the data sample for the real point and/or based on data from other meters and/or other data sources (e.g., a weather forecast system, a building model simulation, a building schedule, etc.). For example, a virtual enthalpy point that represents the enthalpy of a fluid can be calculated based on real points that represent the temperature and pressure of the fluid.

At step 814, the value for the real point from step 810 and the value for the virtual point from step 812 are associated with the meter 602. That is, based on the association of the real point and the virtual point with the meter 602 represented by the meter object (i.e., as created at step 802), the analytics system 604 associates the values for the real point and the virtual point with the meter 602. At step 816, the analytics system 604 calculates a metric based on the values associated with the meter 602, i.e., the value of the real point and the value of the virtual point. For example, the analytics system 604 may add, multiply, average, or perform other mathematical operations on the values to calculate the metric. As another example, the values associated with the meter 602 may be used with values associated with one or more additional meters 602 to calculate a metric or a key performance indicator, or to generate a graphical representation of the operation of building equipment. In all such calculations, the analytics system 604 treats the values in a substantially identical way, i.e., without regard to the real or virtual nature of the points.

Referring now to FIG. 9, a meter configuration interface 900 for mapping and creating points under an online meter is shown, according to an exemplary embodiment. The meter configuration interface 900 may be generated by the analytics system 604 (e.g., by the point virtualization circuit 608) of FIG. 6. The meter configuration interface 900 includes a points tree widget 902, a meter distribution tree widget 904, and a meter details widget 906.

The points tree widget 902 includes search features 908, for example including drop down selections, list toggles, and/or a text search feature to allow a user to find and select any point already created in the BMS 600. Search results may be presented in the points tree widget 902. The points tree widget 902 thereby allows a user to search for and then select a point to add the point to a meter using the meter distribution tree widget 904

The meter distribution tree widget 904 provides a collapsible list 910 of facilities and buildings. The collapsible list 910 indicates that within each building are subcategories of building infrastructure (e.g., electricity, weather) or building subspaces (e.g., Floor 2). The collapsible list 910 further includes entries for meters located with the appropriate subcategory. Listed meters may include a status indicator 912 that shows whether the meter is online, offline, or virtual. A meter may be selected in order to add or delete a point under that meter. In some embodiments, the meter distribution tree widget 904 allows the user to move the meter to a different subcategory, building, or facility to reassign the meter. In some embodiments, the meter distribution tree widget 904 allows the user to delete the meter from the collapsible list 910.

The meter details widget 906 allows a user to add a new meter, a new virtual point, or a new online point. The meter details widget 906 includes a type selection 914 that allows a user to select whether they want to add a new meter, a new virtual point, or a new online point. When the user selects to add a new virtual point, the meter details widget displays entry fields 916 that accept input of a point name, a point description, a unit type, a unit, a point role, and a series type. Some input fields may be indicated as optional, while others may be indicated as required for point creation. The meter details widget may also include a virtual point definition button 918, which is configured to open a virtual point definition widget 1000 (shown in FIG. 10) when selected by a user.

Referring now to FIG. 10, a virtual point definition widget 1000 is shown. Virtual point definition widget 1000 may be generated by the analytics system 604 (e.g., by the point virtualization circuit 608) of FIG. 6. The virtual point definition widget 1000 may include an equipment and meter tree 1002 that lists all equipment, meters, and existing points, organized hierarchically. The virtual point definition widget 1000 also includes a formula entry portal 1004. The formula entry portal 1004 includes a formula field 1006, a numeric value entry field 1008, and operator buttons 1010. A user may create a formula by selecting a point from the equipment and meter tree 1002 to add the point to the formula field 1006. The user may then select operator buttons 1010 to input mathematical operators (e.g., addition, multiplication, division) or logical operators (e.g., OR, AND, NOT, IF, <, >) to the formula field. The user may also input constant numeric values into the formula field using the numeric value entry field 1008. The user may enter multiple existing points, multiple mathematical and logical operators, and multiple constant numerical values into the formula field 1006 to craft a derivation formula for calculating the data output of the new virtual point.

The virtual point definition widget 1000 may also include a validate syntax button 1012. When the validate syntax button 1012 is selected, the analytics system 604 may check the derivation formula in the formula field 1006 for syntax errors. Syntax errors include inoperable combinations of mathematical symbols and failed logical expressions. The system may check all possible point values for points in the formula field to ensure the formula will not encounter any errors and/or will always output a value for the virtual point. In some embodiments, the system highlights particular operators in the formula field that caused a syntax error or suggests corrections.

The virtual point definition widget 1000 may also include a save button 1014. The save button 1014 may be configured to only be selectable after the analytics system 604 has validated the syntax of the derivation formula in the formula field. The save button 1014 allows the user to save the derivation formula for a new virtual point and return to the meter configuration interface 900 shown in FIG. 9. The virtual point definition widget 1000 may also be used to edit derivation formulas for existing virtual points.

Referring now to FIG. 11, a building scorecard dashboard 1100 is shown, according to an exemplary embodiment. The building scorecard dashboard 1100 includes a hierarchical navigation list 1102 of facilities, buildings, building subsystems or subareas, meters, and points. Meters on the navigation list may include a status indictor 1104 configured to show whether that meter is online, offline, or virtual. Points listed under meter include both real points and virtual points. When a meter is selected on the navigation list, a meter visualization widget 1106 may be displayed on the building scorecard dashboard. The meter visualization widget 1106 may include a graphical representation of the data associated with all points under the meter, include real and virtual points. Time selection 1108 may be available in the upper right corner and can be switched easily between one week, one month, three months, six months, one year, and any custom range. The graphical display may then be adjusted to display data from the selected time range. A grid toggle 1110 may also be available to easily switch between the graphical display and a display of the meter data in a grid format.

The meter visualization widget 1106 presents data from a virtual point in the same way it presents data from real points. The building scorecard dashboard 1100 may also include displays of building and facility key performance indicators that include data roll-ups from all meters in the buildings or facilities. Virtual points are treated identically to real points in these roll-up calculations and in generating visualizations for the building scorecard dashboard.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
a meter configured to provide data samples of a real point, the real point corresponding to a first physical parameter measured by the meter;
an analytics circuit configured to:
store a real point object representing the real point;
store a meter object representing the meter, the meter object comprising a points attribute that lists one or more point objects associated with the meter object including at least the real point object; and
store a virtual point object representing a virtual point, the virtual point corresponding to a second physical parameter not measured by the meter; and
update the points attribute in the meter object to list the virtual point object as one of the point objects associated with the meter object;
receive a data sample of the real point from the meter;
calculate a value of the virtual point; and
calculate a metric based on the data sample of the real point and the value of the virtual point; and
a system manager configured to control building equipment using the metric to affect the first physical parameter and the second physical parameter.

2. The building management system of claim 1, wherein the analytics circuit is configured to calculate the value of the virtual point using a formula stored in the virtual point object.

3. The building management system of claim 2, wherein the analytics circuit is configured to generate a graphical user interface that allows a user to input the formula.

4. The building management system of claim 2, wherein the formula defines the value of the virtual point as a function of the data sample of the real point.

5. The building management system of claim 1, wherein the first physical parameter and the second physical parameter characterize operation of the building equipment.

6. The building management system of claim 5, wherein the analytics circuit is further configured to generate a graphical user interface that includes a graphical representation of the operation of the building equipment based on the data sample of the real point and the value of the virtual point.

7. The building management system of claim 6, wherein the graphical user interface comprises a first indicator identifying the real point as real and a second indicator identifying the virtual point as virtual.

8. A method for managing a building, comprising:
collecting, by a meter, data samples of a real point, the real point corresponding to a first physical parameter measured by the meter;
storing a real point object representing the real point;
storing a meter object representing the meter, the meter object comprising a points attribute that lists one or more point objects associated with the meter object including at least the real point object; and
storing a virtual point object representing a virtual point, the virtual point corresponding to a second physical parameter not measured by the meter; and
updating the points attribute in the meter object to list the virtual point object in as one of the point objects associated with the meter object:
receiving a data sample of the real point from the meter;
calculating a value of the virtual point;
calculating a metric based on the data sample of the real point and the value of the virtual point; and
controlling, based on the metric, building equipment to affect the first physical parameter and the second physical parameter.

9. The method of claim 8, wherein calculating the value of the virtual point comprises:
storing a formula in the virtual point object; and
calculating the value using the formula.

10. The method of claim 9, comprising generating a graphical user interface that allows the user to input the formula.

11. The method of claim 9, wherein the formula defines the value of the virtual point as a function of the data sample for the real point.

12. The method of claim 9, wherein the first physical parameter and the second physical parameter characterize operation of the building equipment.

13. The method of claim 8, comprising generating a graphical user interface that includes a graphical representation of the operation of the building equipment based on the data sample of the real point and the value of the virtual point.

14. The method of claim 13 comprising providing, on the graphical user interface, a first indicator identifying the real point as real and a second indicator identifying the virtual point as virtual.

15. A building management system, comprising:
building equipment operable to affect a variable state or condition of a building;
a plurality of meters configured to collect data samples of a plurality of real points relating to an operation of the building equipment;
an analytics circuit configured to:
generate a graphical user interface, the graphical user interface comprising:
a points tree widget comprising a list of the plurality of real points;
a meter distribution tree widget comprising a list of the plurality of meters; and
a meter details widget configured to allow a user to add a virtual point to the list of real points; and
receive data samples of the plurality of real points;
calculate a value of the virtual point; and
calculate a metric based on the data samples of the plurality of real points and the value of the virtual point; and
a system manager configured to control the building equipment based on the metric.

16. The building management system of claim 15, wherein the graphical user interface comprises a virtual point definition widget configured to allow a user to input a formula that defines the virtual point.

17. The building management system of claim 16, wherein the analytics circuit is configured to generate the value of the virtual point using the formula and a first data sample of a first real point of the plurality of real points.

18. The building management of claim 16, wherein the analytics circuit is configured to generate a graphical representation of an operation of the building equipment using the formula and the data samples of the plurality of real points.

19. The building management system of claim 16, wherein the virtual point definition widget comprises:
a formula field;
a list of the plurality of real points, each real point on the list of real points selectable to add the real point to the formula field; and a plurality of operator buttons, each operator button selectable to add an operator to the formula field;
wherein the formula comprises one or more real points and one or more operators to define the virtual point as a function of the one or more real points.

20. The building management system of claim 19, wherein the analytics circuit is configured to check the formula input by the user for syntax errors.

* * * * *